United States Patent [19]
Swartwout

[11] Patent Number: 6,138,755
[45] Date of Patent: Oct. 31, 2000

[54] METHOD FOR ENHANCING THE COMPATIBILITY OF A ZINC-BRINE COMPLETION FLUID WITH A FRACTURING FLUID

[75] Inventor: Rosa Swartwout, Sedona, Ariz.

[73] Assignee: Tetra Technologies, Inc., The Woodlands, Tex.

[21] Appl. No.: 09/080,993

[22] Filed: May 19, 1998

[51] Int. Cl.[7] .................................................. E21B 43/26
[52] U.S. Cl. ........................ 166/250.1; 166/308; 166/271
[58] Field of Search ................................. 166/308, 250.1, 166/271, 291; 507/904, 925

[56] References Cited

U.S. PATENT DOCUMENTS

| | | | |
|---|---|---|---|
| 4,490,262 | 12/1984 | Stauffer et al. | 252/8.55 R |
| 4,536,297 | 8/1985 | Loftin et al. | 252/8.5 |
| 4,541,485 | 9/1985 | Block | 166/281 |
| 4,762,625 | 8/1988 | Dadgar | 252/8.551 |
| 4,828,726 | 5/1989 | Himes et al. | 166/305.1 |
| 4,938,288 | 7/1990 | Bridges | 166/305 |
| 4,959,165 | 9/1990 | Grimsley | 252/8.551 |
| 5,612,293 | 3/1997 | Swartwout et al. | 507/110 |
| 5,710,111 | 1/1998 | Van Slyke | 507/137 |

*Primary Examiner*—David Bagnell
*Assistant Examiner*—Zakiya Walker
*Attorney, Agent, or Firm*—Jo Katherine D'Ambrosio

[57] ABSTRACT

In a method for enhancing the compatibility of a zinc-brine completion fluid with a fracturing fluid, test samples of selected completion fluids are combined with test samples of selected fracturing fluids to form an admixture. The parameters of incompatibility between the completion fluid and the fracturing fluid are analyzed and identified. The parameters or indicia of incompatibility identified can be precipitation, emulsification and/or an increase in viscosity. The zinc brine completion fluid is then blended with additives to remove these parameters of incompatibility. The additives can be selected from a group comprising hydrochloric acid, hydrobromic acid, acetate salts, citrate salts, and surfactants. At the well site, the altered zinc brine completion fluid is pumped in to displace drilling fluids in the wellbore before pumping in fracturing fluid. Additional altered brine completion can follow the fracturing fluid into the wellbore. Commingling of the altered zinc brine completion fluid with fracturing fluid in the wellbore or the formation can occur without substantial damage to the formation.

17 Claims, 3 Drawing Sheets

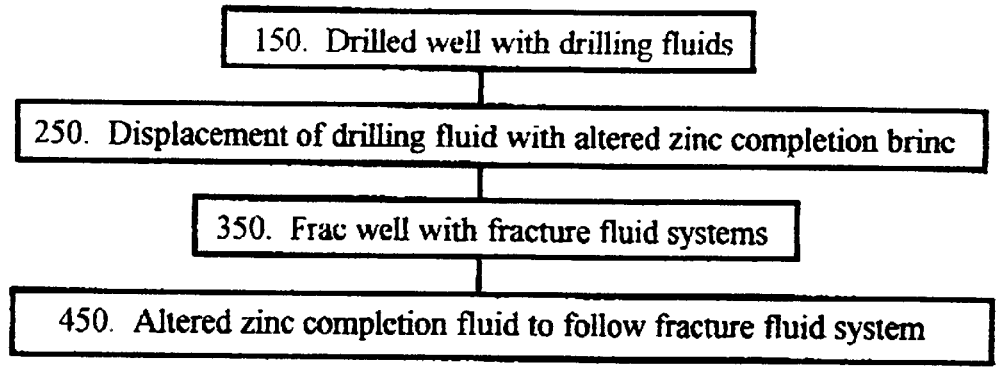
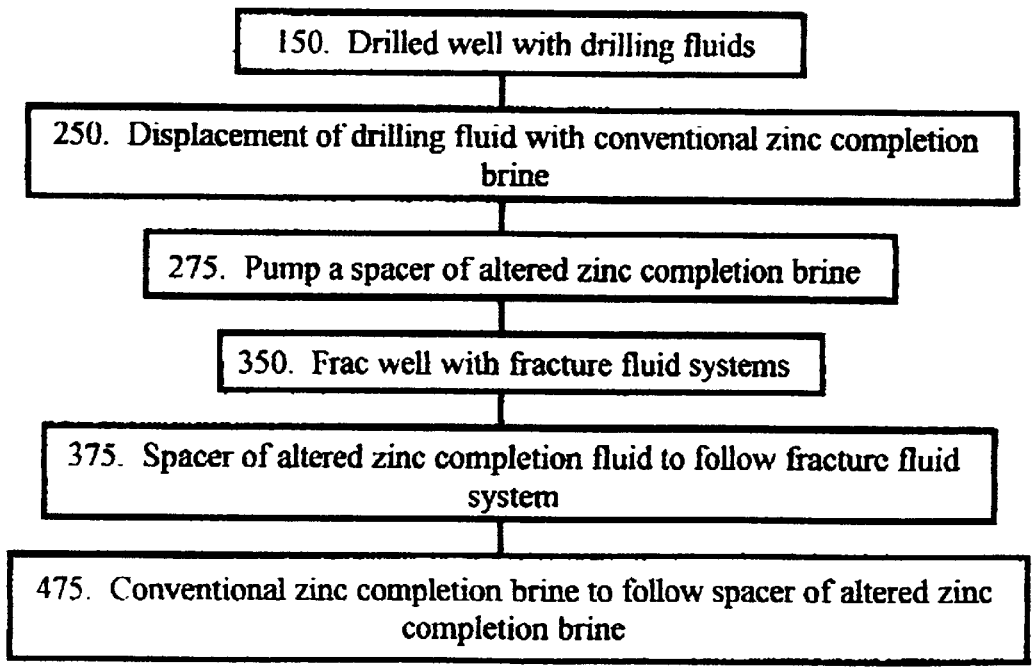

METHOD FOR ENHANCING THE COMPATIBILITY OF A ZINC-BRINE COMPLETION FLUID WITH A FRACTURING FLUID

FIELD OF THE INVENTION

The present invention relates to a method for enhancing the compatibility of a zinc-brine completion fluid with a fracturing fluid. Particularly, the invention is directed to a method for identifying and removing incompatibility factors between zinc-brine completion fluids and fracturing fluids.

BACKGROUND OF THE INVENTION

Fracturing is the process of creating fractures in an oil or gas formation to increase productivity of the oil or gas well. Increasing flow surface area of the producing formation allows for better flow of the hydrocarbons. Hydraulic fracturing involves injecting high-pressure fluids into a formation under sufficient pressure to fracture the rock formation that holds the hydrocarbons. A proppant, like glass beads or other particles, is added to the fluid used to maintain the fracture in the formation so that when the pressure is decreased, the fractures will not close completely. This allows for increased flow within a given formation. Hydraulic fracturing can be used on most formations, and it is sometimes combined with acidizing.

However, reservoir engineers have determined that many wells still produce at less that their potential production rates, even after having undergone the fracturing process. This is because the formation in the vicinity of the wellbore has suffered some form of damage which effectively results in a barrier or "skin" being formed at the interface of the wellbore with the producing formation. Darley & Gray (1988) *Composition and Properties of Drilling and Completion Fluids,* 5th Ed., Gulf Publishing Co., Houston, page 481.

"Skin effect" is a measurement estimating the restriction to flow through the reservoir walls adjacent the wellbore. Positive values of skin effect indicate damage to the formation adjacent the wellbore resulting in reduced permeability.

Although the contaminated or damaged zone causing the skin effect may only extend a few feet into the formation, it can cause quite large reductions in productivity by reducing the reservoir pressure at the radius of interface with the wellbore. Since flow system is pressure driven, an artificially lower pressure at the wellbore formation interface results in a less than optimal production rate from the well. This is because fluid flow in this system is essentially radial, and therefore, the pressure lost across the damaged zone is proportional to the natural log of the damage zone (rd) divided by the radius of the well (rw). Because the pressure differential across the damage zone is logarithmic, even small changes in the ratio of the radius of the damage (rd) to the radius of the well (rw) can have a significant influence on the pressure drop across the damage zone. Therefore, any technology which can reduce the skin effect by decreasing the amount of formation damage which defines the radius of the damage zone (thereby increasing permeability) is beneficial to the industry by increasing production rates and helping prevent the waste of otherwise unrecoverable petroleum resources. There are many causes of formation damage and the resultant skin effect including: fluid invasion, solids invasion, emulsions, clays hydration, change of metability and in situ precipitation.

One source of production damage resulting in positive skin effects occurs when there is an inherent physical or chemical incompatibility between the fluid used prior to and subsequent to the fracturing fluid to finish the well. Completion fluids are used to displace drilling fluids and other debris, which otherwise could block the pores of the producing strata causing skin effect. Examples of completion fluids are disclosed in Block, U.S. Pat. No. 4,541,485; Stauffer et al., U.S. Pat. No. 4,490,262; and Grimsley, U.S. Pat. No. 4,959,165.

Typically, during the completion process, some completion brine is lost to the formation prior to fracturing the well. Also, after the fracturing process, residual fracturing fluids remain in the wellbore, pores and channels of the formation strata. If the completion fluid and the fracturing fluid are not fully compatible, their incompatibility may manifest when the two fluids interact. The interaction occurs from physical contact of frac fluids with brine previously lost into the formation and completion fluid that follows the frac fluids. Incompatibility between the fracturing fluid and the completion fluid can result in the formation of precipitants, emulsification, and changes in viscosity.

Insoluble precipitants can cause damage similar to that caused by solids invasion, where the precipitants become trapped and compacted in the pores and channels of the formation. Emulsification can occur as well as the formation of offgases creating gas bubbles, which become trapped in the formation, and cause capillary resistance to flow or block pore openings. Changes in viscosity, particularly increases in viscosity, can reduce the efficiency of the completion fluid, and cause microenvironments of high pressure, which can damage the formation.

Any of these manifestations of incompatibility, alone or in combination, can be a source of skin effect. Bridges, U.S. Pat. No. 4,938,288 at col. 1 lines 28–34, teaches that compatibility of the fluids present in the Formation with the completion fluid is one of four factors determining the possibility and degree of skin effect. Bridges discloses a method of adding an acidic buffer composition to a calcium-based completion fluid.

SUMMARY OF THE INVENTION

In view of the large positive effect that even a small reduction in the radius of the damage zone can have on flow through the formation, what is needed is a method for reducing the incompatibility between fracturing fluids and completion fluids thereby reducing skin effect. A method of detecting and reducing or eliminating incompatibility between fracturing fluids and completion fluids which can be beneficial to improving oil and gas production.

The method of this invention enhances the compatibility of a zinc-brine completion fluid with a fracturing fluid by testing for parameters of incompatibility. Once the parameters are analyzed, additives can be blended with the zinc-brine completion fluid to remove the identified parameter of incompatibility. The method of this invention has the unexpected effect of reducing skin damage in the formation thereby increasing production.

In a preferred method for enhancing the compatibility of a zinc-brine completion fluid with a fracturing fluid the method comprises the steps of: selecting a fracturing fluid and a zinc-brine completion fluid; forming an admixture of the selected fracturing fluid with the selected completion fluid; identifying and analyzing parameters of incompatibility between the fracturing fluid and the completion fluid, the parameters selected form the group consisting of precipitation, emulsification, and increase in viscosity; and blending the selected zinc-brine completion fluid with additives to remove one or more identified parameters of incompatibility.

In one preferred method, the zinc-brine completion fluid comprises zinc salts and one or more salts selected form the group consisting of calcium halide, sodium halide, potassium halide, cesium halides, calcium formates, sodium formates, potassium formates, cesium formates, individually or in combinations thereof. In this method, the density of the zinc-brine completion fluid is within a range of from 11.5 ppg to 21.0 ppg. Preferably, the zinc-brine completion fluid comprises zinc bromide. The amount of zinc can be within a range of from 0.1% to 33% by weight.

The preferred additives are selected from the group consisting of hydrochloric acid, hydrobromic acid, acetate salts, citrate salts, and surfactants. Preferably, the amount of hydrochloric acid is within a range of from 0.05% to 2.5% by weight. If hydrobromic acid is used, the amount of hydrobromic acid is within a range of from 0.05% to 2.5% by weight. The amount of either the acetate salts or the citrate salt can be within a range of from 0.05% to 2.5% by weight and the surfactants can be within a range of from 20 ppm to 10,000 ppm.

In an alternative method for enhancing the compatibility of a zinc-brine completion fluid with a fracturing fluid when fracturing a formation, the method comprises:

selecting a fracturing fluid and a zinc-brine completion fluid;

forming an admixture of the selected fracturing fluid with the selected completion fluid;

identifying and analyzing parameters of incompatibility between the fracturing fluid and the completion fluid, the parameters selected from the group consisting of precipitation, emulsification, and increase in viscosity;

blending the selected zinc-brine completion fluid with additives to remove one or more of the identified parameters of incompatibility;

displacing drilling fluids in a wellbore with the altered zinc-brine completion fluid; and pumping fracturing fluid into the wellbore to form fissures in the formation wherein the altered zinc brine completion fluid commingles with the fracturing fluid without substantial damage to the formation.

This method can further comprise the step of pumping additional altered zinc brine completion blend into the wellbore to follow the fracturing fluid. Preferably, the additives are selected from the group consisting of hydrochloric acid, hydrobromic acid, acetate salts, citrate salts, and surfactants.

In still another alternative method for enhancing the compatibility of a zinc-brine completion fluid with a fracturing fluid the steps can comprise:

selecting a fracturing fluid and a zinc-brine completion fluid;

forming an admixture of the selected fracturing fluid with the selected completion fluid;

identifying and analyzing parameters of incompatibility between the fracturing fluid and the completion fluid, the parameters selected from the group consisting of precipitation, emulsification, and increase in viscosity;

blending the selected zinc-brine completion fluid with additives selected from the group consisting of hydrochloric acid, hydrobromic acid, acetate salts, citrate salts, and surfactants to remove one or more identified parameters of incompatibility.

This method can further comprising the steps of: (a) analyzing precipitate to determine composition, and (b) blending zinc-brine completion fluid with at least one of the acids, one of the salts or a combination thereof to remove the incompatibility factor of precipitation. This method can also comprise the further steps of: (a) analyzing emulsification, (b) determining pH sensitivity (c) adjusting pH, (d) blending zinc-brine completion fluid with at least one of acids and at least one of the surfactants to remove the incompatibility factor of emulsification.

In an alternative method for enhancing the compatibility of a zinc-brine completion fluid with a fracturing fluid when fracturing a formation the steps can comprise:

selecting a fracturing fluid and a zinc-brine completion fluid;

forming an admixture of the selected fracturing fluid with the selected completion fluid;

identifying and analyzing parameters of incompatibility between the fracturing fluid and the completion fluid, the parameters selected form the group consisting of precipitation, emulsification, increase in viscosity and pH sensitivity;

blending the selected zinc-brine completion fluid with additives to remove one or more identified parameters of incompatibility thereby forming an altered zinc-brine completion fluid;

displacing the drilling fluids with conventional, unaltered zinc brine completion, displacing the conventional completion fluid within the area immediately in front of the fracturing fluid with altered zinc completion fluid;

pumping fracturing fluid into the wellbore to form fissures in the formation;

pumping altered zinc-brine completion fluid into the area of the wellbore immediately after the fracturing fluid wherein the altered zinc-brine completion fluids in the area of the wellbore immediately in front of and immediately in back of the fracturing fluid commingles with the fracturing fluid without substantial damage to the formation.

BRIEF DESCRIPTION OF THE DRAWINGS

FIG. 2 is a flow diagram depicting the methodology of fracturing a formation with a fracturing fluid compatible with a zinc-brine completion fluid according to the present invention.

FIG. 3 is a flow diagram depicting in greater detail the methodology of this invention.

DETAILED DESCRIPTION OF THE INVENTION

Reference will now be made in detail to the present preferred embodiment of the invention as depicted in the accompanying drawings, flowcharts and examples. In the method of this invention, the compatibility of a specific fracturing (frac) fluid with a specific zinc-brine completion fluid is enhanced to substantially reduce skin damage in formations, thereby improving the net production rate of the well.

The operator of a well selects completion fluids and frac fluids according to various physical and chemical properties of the formation and well economic factors. The method of altering a completion fluid to enhance its compatibility to a fracturing fluid as taught by this invention can increase the production rate of the well. In a preferred method of this invention, one or more frac fluids, typically a high viscosity, crosslinked gel, is selected from commercially available frac fluids sold under brand names such as HYBOR frac fluid. A zinc-brine completion fluid is then selected from commercially available completion fluids as known in the art.

Figure 1:
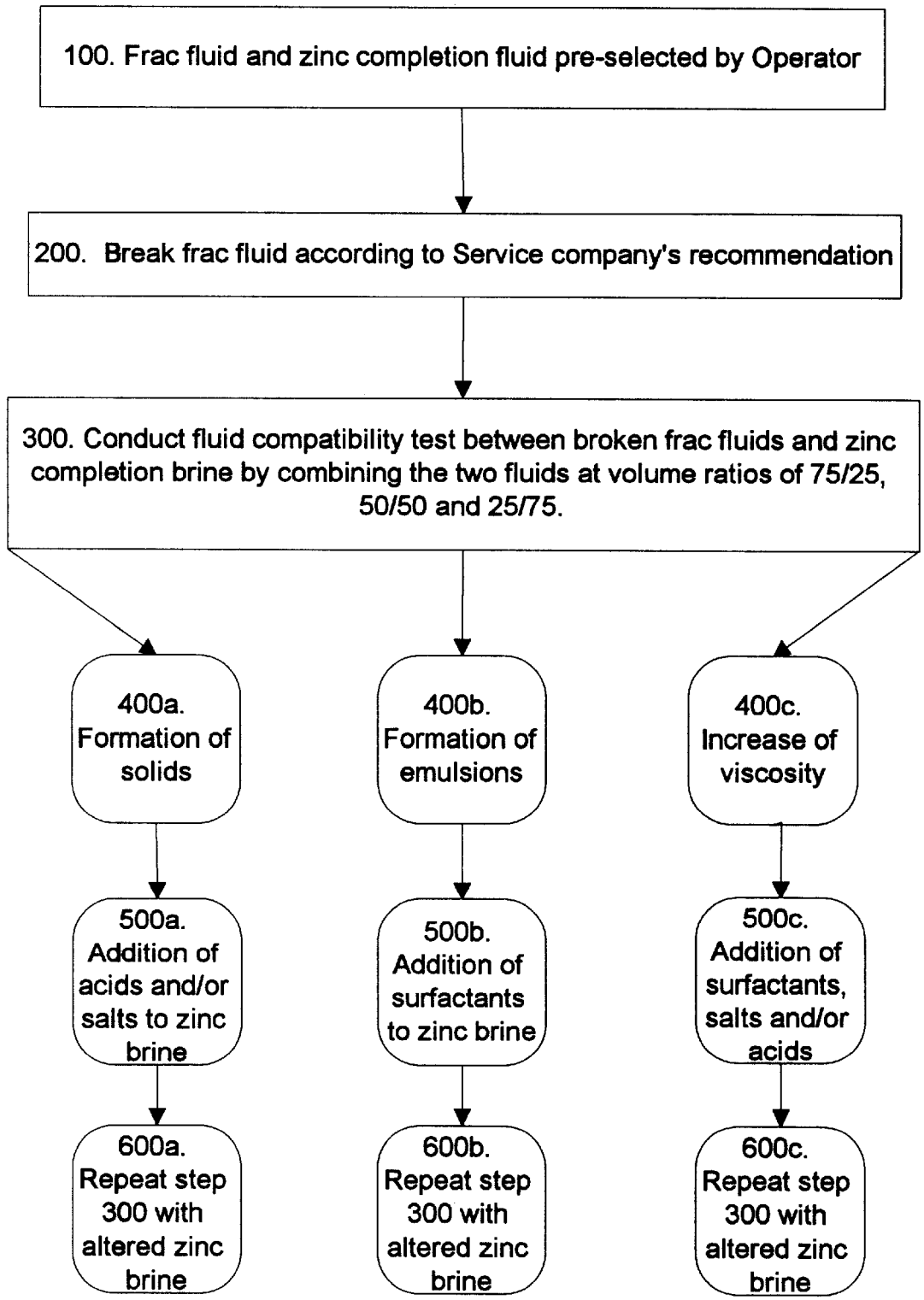
FIG. 1 is a flow diagram depicting the methodology for enhancing the compatibility of a zinc-brine completion fluid with a fracturing fluid according to the present invention.

In a preferred embodiment as depicted in FIG. 1, after a frac fluid and a zinc-brine completion fluid have been selected 100, the frac fluid is broken following the recommendation of the service company 200. Samples of the frac fluid and the zinc-brine completion fluid are combined to form an admixture 300 for use as test samples. The resulting test samples are observed to identify various indicia of incompatibility 400 between the frac fluid and the completion fluid. These parameters of incompatibility can include, for example, precipitation, emulsification, and changes in viscosity. Each parameter of incompatibility is the analyzed 400 as to its physical and chemical properties so that one or more additives can be blended with the completion fluid to remove the factors causing the incompatibility 500.

A completion fluid is selected to meet the well operator's density and crystallization criterion. A preferred completion fluid is a zinc-brine completion fluid that can also comprise zinc salts selected from the group consisting of zinc halides, preferably zinc chloride, zinc bromide or a combination of both. Alternatively, the completion fluid can comprise zinc formates. Other alternative zinc salt completion fluids can comprise calcium halides, including calcium chloride and/or calcium bromide; sodium halides such as sodium chloride and/or sodium bromide, for example; potassium halides; cesium halides; calcium formates; sodium formates; potassium formates; and cesium formates; individually or in combinations thereof. Preferably, the selected completion fluid should have the following characteristics: cause little permeability damage, minimal corrosion, remain stable downhole, have the required viscosity and crystallization point and weigh up to the desired density.

The preferred density of the zinc-brine completion fluid is within a range of from 11.5 ppg to 21.0 ppg. A density within this range is required to maintain hydrostatic pressure against the down hole pressure to prevent blowout. Typical completion fluid composition comprise zinc bromide in an amount within a range of from 0.5% to 78% by weight. A preferred completion fluid comprises zinc bromide; preferably the amount of zinc is within a range of from 0.1% to 33% by weight. The crystallization point of the completion fluid can vary from −50° F. to +70° F. depending on well conditions. The methodology of selection of a completion fluid with the proper crystallization point is found in the *American Petroleum Institute Recommended Practices,* 2nd edition, section 13j (Testing of Heavy Brines). Reservoir conditions will dictate other desired changes in the composition of a completion fluid, a calcium-free composition, for example.

The preferred frac fluid has the following characteristics: capacity to transfer sufficient energy to create the desired fractures and the capacity to place sufficient proppants in the formation while leaving minimal residuals after degradation. Preferably, the frac fluid comprises the following: a biocide, de-emulsifier, guar gum, brine such as potassium chloride, an internal breaking agent, a cross-linker, and a caustic.

After the frac fluid and completion fluid are selected for their desired characteristics by an operator, test samples are taken to determine the compatibility of the two fluids. Treatment of the test samples simulates conditions within the reservoir. For example, prior to blending of the test samples, the frac fluid sample is broken according to the service company's recommendations FIG. 1, 200. Breaking is required because the frac fluid is typically in gel form to carry the proppants. After the proppants are in place in the reservoir formation, the frac fluid is broken so that it can be removed from the formation. The breaking of the frac fluid is the degradation of the gel to a liquid. The test sample frac fluid is broken so that it can be blended with the completion fluid.

To test the compatibility of the broken frac fluid and the zinc brine completion fluid, a specific volume of each fluid is blended in ratios to simulate the mixing of the two fluids at the well site and within the reservoir. The ratio of the volumes of completion fluid to frac fluid is a function of flow versus time. Preferably, three volume ratios are used for each test sample of the blend of the selected completion fluid and frac fluid: 25% brine completion fluid to 75% frac fluid, 50% brine completion fluid to 50% frac fluid and 75% brine completion fluid to 25% frac fluid 300. Other volume ratios can also be tested. After each volume sample is blended to form an admixture, each admixture is observed for signs or parameters of incompatibility. The incompatibility parameters can comprise precipitation, emulsification, and an increase or change in viscosity. Other parameters of incompatibility can include gas formation and pH sensitivity. The parameters of incompatibility between the frac fluid and the zinc brine completion fluid are thus identified as illustrated in FIG. 1 400. The incompatibility parameters are then analyzed to determine how best to remove them from the admixture.

In a preferred embodiment, additives are blended with the zinc-brine completion fluid to remove the various parameters of incompatibility. If precipitation or the formation of solids is observed, acids and/or salts are added 500a to the zinc brine completion fluid to remove this incompatibility factor. Precipitation or solids formation in the reservoir lowers the permeability of the formation and contributes to skin effect. After altering the zinc brine fluid, the volume samples are blended again using the altered zinc brine completion fluid and then observed for signs of precipitation as well as other parameters of incompatibility. The acid additives for removing precipitation preferably comprise hydrochloric acid and/or hydrobrornic acid within a range of from 0.05% or 2.5% by weight. Additional salt additives can also be combined with the brine completion fluid to prevent precipitation. The salt additives can comprise acetate salts, citrate salts or a combination of both. Preferred salts comprise calcium acetate and/or sodium acetate. Preferably, the amount of acetate salt is within a range of from 0.05% to 2.5% by weight. Test samples comprising the admixture of altered zinc brine fluid and frac fluid are observed and additives are added or removed from the zinc brine fluid until little or no precipitation occurs. At that point the altered zinc brine and frac fluid are compatible as to the parameter of precipitation. The composition of the preferred additives and zinc brine completion fluid is noted and used for preparation of an altered zinc brine completion fluid that will come in contact with the frac fluid at the well site.

Referring to FIG. 1, if emulsions are observed in the test samples, surfactants are added to the zinc brine completion fluid to prevent or remove emulsions 500b. The altered zinc brine completion fluid is blended with the frac fluid and observed for parameters of incompatibility. Various quantities and types of surfactant are added until the incompatibility parameter of emulsion formation is significantly reduced or eliminated. The surfactant can comprise cationic, anionic, nonionic or a combination thereof. The preferred surfactant is within a range to form 20 ppm to 10,000 ppm. In one method on this invention, a nonionic surfactant is first added to the zinc brine completion fluid, the zinc brine fluid is observed for emulsion formation. If emulsification continues to occur, the tests are repeated until the proper surfactant or combinations of surfactants are found so that the surfactant additives remove this incompatibility factor. Formation of gas bubbles can be one of the causation's factor of emulsification and surfactant additives are used to reduce this factor also. It is important to note that the test samples must be observed and additives adjusted so that the addition of one additive does not create other incompatibility factors in the altered zinc brine fluid.

If test samples of the admixture exhibit changes in viscosity, particularly increases in viscosity, the zinc brine completion fluid is altered by the addition of acids, salts, surfactants or a combination thereof 500c. Increased viscosity can be caused by polymers or by the formation of colloids. Acids in the same family as those added to remove precipitation can be added. The additives for the removal of the incompatibility parameter of increase viscosity can be selected the from the group comprising hydrochloric acid, hydrobromic acid, acetate salts, citrate salts, and surfactants. PH sensitivity is another parameter of incompatibility of completion fluids and frac fluids. Adjusting the pH with the use of acids and bases is know in the art. Those familiar with the art of completion fluids and frac fluid preparation understand that testing may be repeated 600a, 600b, 600c after each additive is combined with the zinc completion fluid until the optimum combination of additives is discovered that removes the parameters of incompatibility.

Referring now to FIG. 2, after the optimum combination of additives and completion fluid is arrived at and communicated to the operator of a well, the operator selects a completion fluid, altered according to the above testing, so that it is now compatible with the selected frac fluid. The well is drilled with the use of drilling fluids 150 and then the drilling fluids are displaced with the altered zinc-brine completion blend 250 in the wellbore to remove drilling debris and other damaging particles. As known in the art, the altered completion fluids may be circulated out of the wellbore and a frac fluid system (more than one type of frac fluid may be utilized for fracturing a formation) pumped into the wellbore and the formation to form fissures and pores in the formation 350. The frac fluid system can be followed by more altered zinc brine completion fluid 450. Commingling of the completion fluid and frac fluid can occur when the two fluids come in contact with each other. Using the zinc brine completion fluid altered according to the method described above allows the frac fluid to be more compatible with the completion fluid if commingling does occur thereby reducing the undesirable reactions such as precipitation or emulsification that can cause skin damage and a decrease of production from the formation.

Figure 4:
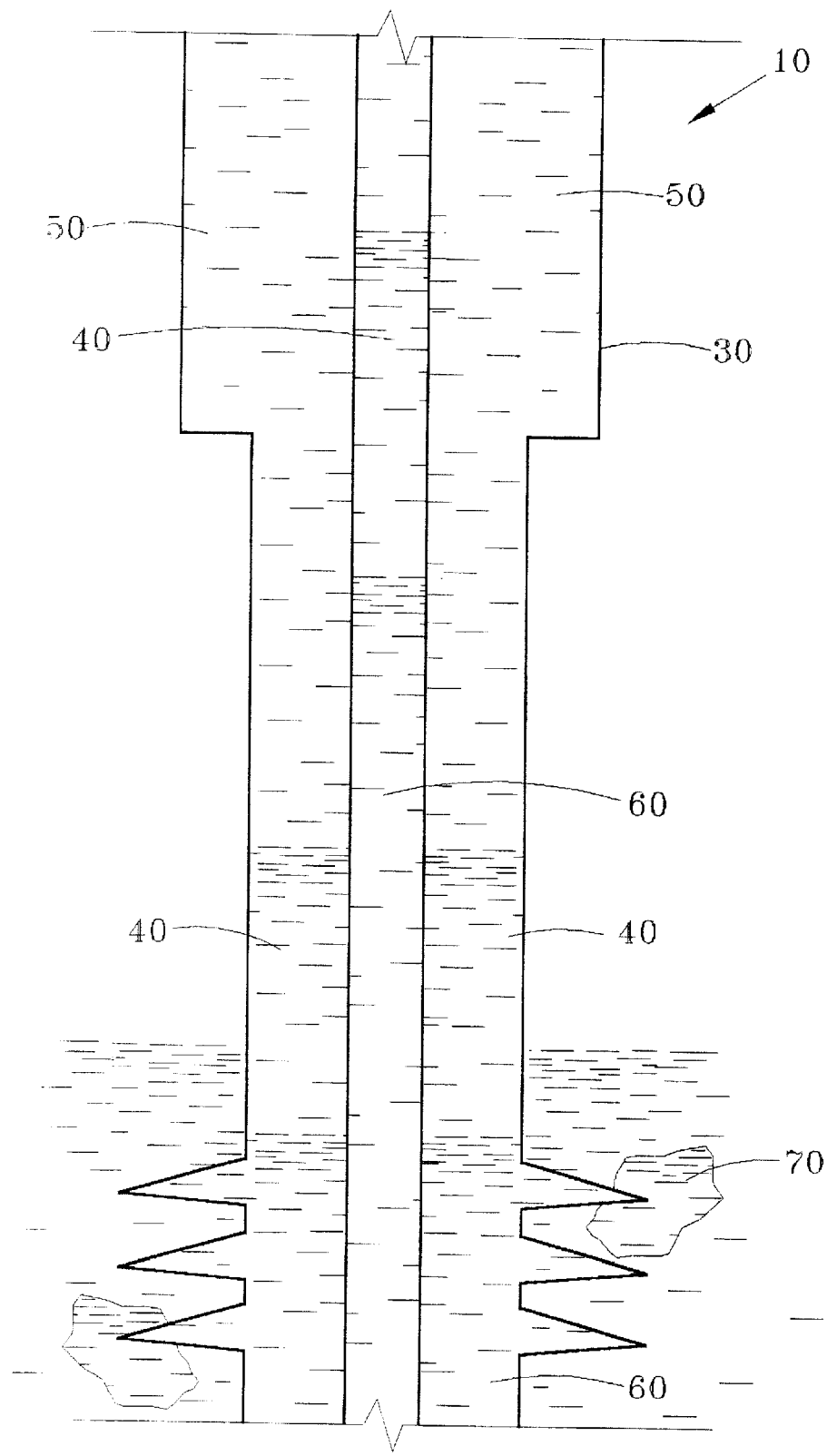
FIG. 4 is a schematic diagram depicting the alternative embodiment of this invention detailed in FIG. 3.

In an alternative embodiment of the method of this invention, as illustrated in the flowchart of FIG. 3 and FIG. 4, depicting a schematic drawing of a well 10, lesser amounts of altered zinc brine completion fluid 40 are used. In this embodiment, both conventional brine completion fluids 50 and altered zinc brine completion fluids 40 are used to complete the well 10

In this embodiment, after the well 10 is drilled with the use of drilling fluids 150, the drilling fluids are displaced with a conventional brine completion fluid 250, 50 because the conventional brine completion fluids 50 are less expensive than the altered completion fluids. Prior to pumping in the frac fluids 60, however, a spacer fluid of altered completion fluid 40 is pumped in to substantially separate the conventional completion fluid 50 from the fracturing fluids 275, 60. Altered brine completion fluid is pumped in for a distance of at least 50 feet in front of the fracturing fluid 60. The amount of altered zinc brine completion fluid 40 is determined by the operator based on conditions at the well site and costs considerations. Preferably, the amount of altered brine completion fluid 40 is sufficient to separate the frac fluid 60 from the conventional completion fluid 50 so that commingling of the fracturing fluid only occur s with the more compatible altered brine completion fluid 40. After the fracturing fluid system 60 is introduced into the wellbore 350, 30, another spacer of altered zinc brine completion fluid 375, 40 is pumped into the wellbore followed by additional conventional completion fluid 50. In this way, commingling of the frac fluid 60 occurs with the compatible, altered zinc brine completion fluid 40 but the consumption of the expensive altered completion fluid 40 is minimized. In this way, commingling of the two fluid s 40, 60 may occur within the formation 70 without substantial skin damage to the walls of the formation 70.

EXAMPLE

Compatibility tests of a frac fluid and a completion fluid were conducted. The frac fluid was a HYBOR brand frac fluid and the completion fluid was a zinc brine completion fluid produced by Tetra Technologies, Inc. The completion fluid had a density of 15.1 ppg, and was comprised of calcium chloride, calcium bromide and zinc bromide. The crystallization point of the completion fluid was 30° F. Four sets of tests were conducted using the typical volume ratio of brine completion fluid to frac fluid that occurs when the two are commingled at the well site.

TABLE 1

| TEST | BRINE/FRAC FLUID | TREATMENT | OBSERVATIONS |
| --- | --- | --- | --- |
| 1 | 25/75 | none | heat released; precipitation settled |
| 2 | 50/50 | none | heat released; precipitation |
| 3 | 75/25 | none | heat released; precipitation |
| 4 | 25/75 | 0.25% HCl & 0.25% Calcium Acetate | heat; gel-like particles dispersed |
| 5 | 50/50 | 0.25% HCl & 0.25% Calcium Acetate | heat released, no precipitation |
| 6 | 75/25 | 0.25% HCl & 0.25% Calcium Acetate | heat released, no precipitation |
| 7 | 25/75 | 0.5% HCl & 0.25% Calcium Acetate | heat released, no precipitation |
| 8 | 50/50 | 0.5% HCl & 0.25% Calcium Acetate | heat released, no precipitation |
| 9 | 75/25 | 0.5% HCl & 0.25% Calcium Acetate | heat released, no precipitation |
| 10 | 25/75 | 0.5% HCl & 0.5% Calcium Acetate | heat released, no precipitation |
| 11 | 50/50 | 0.5% HCl & 0.5% Calcium Acetate | heat released, no precipitation |
| 12 | 75/25 | 0.5% HCl & 0.5% Calcium Acetate | heat released, no precipitation |

The results as shown in the table indicate that the addition of additives can eliminate the incompatibility factor of precipitation.

The foregoing description, drawing and flowcharts are illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claimed is:

1. A method for enhancing the compatibility of a zinc-brine completion fluid with a fracturing fluid comprising the steps of:
   (a) selecting a fracturing fluid and a zinc-brine completion fluid;
   (b) forming an admixture of the selected fracturing fluid with the selected completion fluid;
   (c) identifying and analyzing parameters of incompatibility between the fracturing fluid and the completion fluid in the admixture of step (b), the parameters selected form the group consisting of precipitation, emulsification, and increase in viscosity;
   (d) blending the zinc-brine completion fluid selected in step (a) with additives to remove one or more parameters of incompatibility identified in step (c).

2. The method of claim 1 wherein the zinc-brine completion fluid comprises zinc salts and one or more salts selected form the group consisting of calcium halide, sodium halide, potassium halide, cesium halides, calcium formates, sodium formates, potassium formates, cesium formates, individually or in combinations thereof.

3. The method of claim 1 wherein the density of the zinc-brine completion fluid is within a range of from 11.5 ppg to 21.0 ppg.

4. The method of claim 1 wherein the zinc-brine completion fluid comprises zinc bromide.

5. The method of claim 4 wherein the zinc-brine completion fluid comprises an amount of zinc that is within a range of from 0.1% to 33% by weight.

6. The method of claim 1 wherein the additives are selected from the group consisting of hydrochloric acid, hydrobromic acid, acetate salts, citrate salts, and surfactants.

7. The method of claim 6 wherein the amount of hydrochloric acid is within a range of from 0.05% to 2.5% by weight.

8. The method of claim 6 wherein the amount of hydrobromic acid is within a range of from 0.05% to 2.5% by weight.

9. The method of claim 6 wherein the amount of additives selected from acetate salts and citrate salts is within a range of from 0.05% to 2.5% by weight.

10. The method of claim 6 wherein the surfactants are within a range of from 20 ppm to 10,000 ppm.

11. A method for enhancing the compatibility of a zinc-brine completion fluid with a fracturing fluid when fracturing a formation comprising the steps of:
   (a) selecting a fracturing fluid and a zinc-brine completion fluid;
   (b) forming an admixture of the selected fracturing fluid with the selected completion fluid;
   (c) identifying and analyzing parameters of incompatibility between the fracturing fluid and the completion fluid in the admixture of step (b), the parameters selected form the group consisting of precipitation, emulsification, and increase in viscosity;
   (d) blending the zinc-brine completion fluid selected in step (a) with additives to remove one or more parameters of incompatibility identified in step (c) thereby forming an altered zinc brine completion fluid;
   (e) displacing drilling fluids in a wellbore with the altered zinc-brine completion fluid blended according to step (d); and
   (f) pumping fracturing fluid into the wellbore to form fissures in the formation wherein the altered zinc brine completion fluid commingles with the fracturing fluid without substantial damage to the formation.

12. The method of claim 11 wherein the additives are selected from the group consisting of hydrochloric acid, hydrobromic acid, acetate salts, citrate salts, and surfactants.

13. A method for enhancing the compatibility of a zinc-brine completion fluid with a fracturing fluid when fracturing a formation comprising the steps of:
   (a) selecting a fracturing fluid and a zinc-brine completion fluid;
   (b) forming an admixture of the selected fracturing fluid with the selected completion fluid;
   (c) identifying and analyzing parameters of incompatibility between the fracturing fluid and the completion fluid in the admixture of step (b), the parameters selected form the group consisting of precipitation, emulsification, and increase in viscosity;
   (d) blending the zinc-brine completion fluid selected in step (a) with additives to remove one or more parameters of incompatibility identified in step (c) thereby forming an altered zinc brine completion fluid;
   (g) displacing drilling fluids in a wellbore with the altered zinc-brine completion fluid blended according to step (d); and
   (h) pumping fracturing fluid into the wellbore to form fissures in the formation wherein the altered zinc brine completion fluid within the wellbore commingles with the fracturing fluid without substantial damage to the formation;
   (i) pumping additional altered zinc brine completion blend into the wellbore to follow the fracturing fluid.

14. A method for enhancing the compatibility of a zinc-brine completion fluid with a fracturing fluid comprising the steps of:
   (a) selecting a fracturing fluid and a zinc-brine completion fluid;
   (b) forming an admixture of the selected fracturing fluid with the selected completion fluid;
   (c) identifying and analyzing parameters of incompatibility between the fracturing fluid and the completion fluid in the admixture of step (b), the parameters selected form the group consisting of precipitation, emulsification, and increase in viscosity;
   (d) blending the zinc-brine completion fluid selected in step (a) with additives selected from the group consisting of hydrochloric acid, hydrobromic acid, acetate salts, citrate salts, and surfactants to remove one or more parameters of incompatibility identified in step (c).

15. A method for enhancing the compatibility of a zinc-brine completion fluid with a fracturing fluid comprising the steps of:
   (a) selecting a fracturing fluid and a zinc-brine completion fluid;
   (b) forming an admixture of the selected fracturing fluid with the selected completion fluid;
   (c) identifying parameters of incompatibility between the fracturing fluid and the completion fluid in the admixture of step (b), the parameters selected form the group consisting of precipitation, emulsification, and increase in viscosity;
   (d) analyzing precipitate identified in step (c) to determine composition;

(e) blending the zinc-brine completion fluid selected in step (a) with additives selected from the group consisting of hydrochloric acid, hydrobromic acid, acetate salts, citrate salts, and surfactants to remove one or more parameters of incompatibility identified in step (c).

16. The method of claim 15 further comprising the steps of:

(f) blending zinc-brine completion fluid selected in step (a) with at least one of the acids, one of the salts or a combination thereof to remove the incompatibility factor of precipitation, (g) analyzing emulsification, (h) determining pH sensitivity, (i) adjusting pH, (j) blending zinc-brine completion fluid with at least one of acids and at least one of the surfactants to remove the incompatibility factor of emulsification.

17. A method for enhancing the compatibility of a zinc-brine completion fluid with a fracturing fluid when fracturing a formation comprising the steps of:

(a) selecting a fracturing fluid and a zinc-brine completion fluid;

(b) forming an admixture of the selected fracturing fluid with the selected completion fluid;

(c) identifying and analyzing parameters of incompatibility between the fracturing fluid and the completion fluid in the admixture of step (b), the parameters selected form the group consisting of precipitation, emulsification, increase in viscosity and pH sensitivity;

(d) blending the zinc-brine completion fluid selected in step (a) with additives to remove one or more parameters of incompatibility identified in step (c) thereby forming an altered zinc-brine completion fluid;

(e) displacing drilling fluids in a wellbore with conventional, unaltered zinc brine completion fluid;

(f) displacing the conventional unaltered zinc brine completion fluid within an area immediately in front of the fracturing fluid with a spacer of altered zinc-completion fluid blended according to step (d);

(g) pumping fracturing fluid into the wellbore to form fissures in the formation;

(h) pumping altered zinc-brine completion fluid blended according to step (d) into an area of the wellbore immediately after the fracturing fluid wherein the altered zinc-brine completion fluids in the area of the wellbore immediately in front of and immediately in back of the fracturing fluid commingles with the fracturing fluid without substantial damage to the formation.

* * * * *